Jan. 26, 1965 L. J. STASCAVAGE 3,167,664
FLIP-FLOP USING SILICON CONTROLLED RECTIFIERS
Filed Nov. 29, 1962
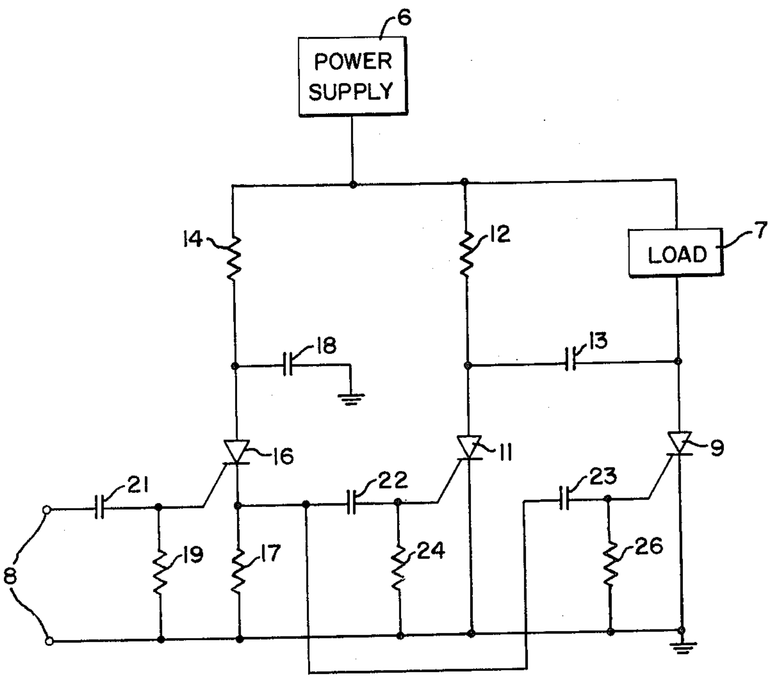
INVENTOR
LEONARD J. STASCAVAGE
BY J. C. Hodges ATTY.
Frank D. Nieman AGENT.

United States Patent Office 3,167,664

Patented Jan. 26, 1965

3,167,664
FLIP-FLOP USING SILICON CONTROLLED RECTIFIERS

Leonard J. Stascavage, Bowie, Md., assignor to the United States of America as represented by the Secretary of the Navy Filed Nov. 29, 1962, Ser. No. 241,084
1 Claim. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention relates to a new and improved electronic circuit having one input to control the alternate on-off switching of a load by successive commands.

The alternate switching on and off of a load by successive commands has been accomplished by various circuitry, both strictly electrical and also combined electromechanical. The electrical type has been of the type in which power is utilized all the time and in the electromechanical it has been the custom to use electromechanical relays to accomplish the switching which are inherently slow when compared to strictly electronic switching.

The general purpose of this invention is to provide a flip-flop having two silicon controlled rectifiers both having but one common input pulse to control the alternate switching from the conductive to the nonconductive state of a load in series with one of the silicon controlled rectifiers by successive small pulses applied to a third silicon controlled rectifier whereby a minimum of power is used since the rectifiers utilized for controlling the switching of the silicon controlled rectifier in series with the load return to the nonconductive state a short predetermined time after becoming conductive.

An object of the present invention is to provide rapid electronic switching, of large currents by a small signal trigger, from one conducting state to another upon successive commands.

Another object of the present invention is to provide the switching apparatus which accomplishes the desired switching by utilizing a minimum power for a short predetermined period of time and thereafter consumes no electrical power.

A further object of the present invention is to provide a more simple and completely electronic circuit for alternately changing the conduction of a load by successive electrical input pulses.

With these and other objects in view, as will hereinafter more fully appear, and which will be more particularly pointed out in the appended claim, reference is now made to the following description taken in connection with the accompanying drawing in which:

The figure shows a schematic diagram of an embodiment of the present invention.

The drawing shows a D.C. power supply 6 which supplies power to energize all of the electrical components of the load circuit as well as the switching circuit. The power supply 6 supplies power to a load 7 which is to be alternately switched from the conductive to the nonconductive state by a series of input pulses applied to a pair of input terminals 8 by an external pulse generator (not shown) which may be any conventional pulse generator that supplies at least 15 milliamperes of current at 1½ volts D.C. power. The load 7 is in a series circuit with a first silicon controlled rectifier 9 having its anode connected to the load and its cathode connected to ground and which in response to the successive pulses supplied to input terminal accomplishes the alternate turning on and turning off of power to the load 7. In a parallel circuit with the load 7 and the first silicon controlled rectifier 9 is a second silicon controlled rectifier 11 in series with a current limiting resistor 12 connected between the power supply 6 and the anode of the silicon controlled rectifier 11 with the cathode of the silicon controlled rectifier 11 being connected directly to ground. This silicon controlled rectifier 11 in conjunction with the silicon controlled rectifier 9 controls the alternate switching of the load from the conductive to the nonconductive state due to the interaction between the current limiting resistor 12 and a capacitor 13 which is connected between the anodes of the two silicon controlled rectifiers 9 and 11 as will be more fully described hereinafter. This portion of this circuit described thus far can be considered the switching or the flip-flop portion of the circuitry.

In parallel with the load 7 and the silicon controlled rectifier 9 is another current limiting resistor 14 connected between the power supply 6 and the anode of a third silicon controlled rectifier 16. A bias resistor 17 is connected between the cathode of the silicon controlled rectifier 16 and ground. A capacitor 18, connected between the anode of the silicon controlled rectifier 16 and ground, controls the length of time that silicon controlled rectifier 16 remains in the conductive state as will be described more fully hereinafter. A bias resistor 19 is connected between the gate of silicon controlled rectifier 16 and ground and a blocking capacitor 21 is connected between the last named gate and the input terminals 8. The circuitry described in this paragraph is the triggering circuitry which is utilized to generate a pulse of the proper magnitude, polarity and time duration to successively trigger the flip-flop trigger.

Connected between the triggering circuit and the flip-flop circuit is a transfer circuit formed of a pair of capacitors 22 and 23, respectively, each having one terminal connected to the junction of the cathode of silicon controlled rectifier 16 and the bias resistor 17 and connected in parallel to the gates of silicon controlled rectifiers 11 and 9, respectively, to transfer the pulse generated by the triggering circuit to the gates of the silicon controlled rectifiers. Connected in parallel between the gates of silicon controlled rectifiers 9 and 11 and ground is a pair of bias resistors 24 and 26 utilized in conjunction with the capacitors 22 and 23 to control the initiation of conduction of the silicon control rectifiers 11 and 9 respectively.

The operation of the circuitry is such that when the load is in the nonconductive state all of the silicon control rectifiers are in the off condition so that no electrical energy is consumed by the circuit under the nonconducting conditions. Under the conducting conditions in which the load 7 is energized silicon controlled rectifier 9 is in the conductive state and the silicon controlled rectifiers 11 and 16 are in the nonconductive state except during the actual switching. Assume that the load is in the nonconductive state and that the silicon controlled rectifiers 9, 11 and 16 are nonconducting and that an input pulse is applied to the input terminals 8 and transferred through the blocking capacitor 21 to initiate conduction of the silicon controlled rectifier 16. Then capacitor 18, which has been charged up to the same potential as the power supply 6, discharges through the silicon controlled rectifier 16 and the bias resistor 17 to ground, thereby presenting a pulse of the proper polarity magnitude and time duration to the transfer circuit including capacitors 22 and 23. The silicon controlled rectifier 16 remains in the conductive state only as long as the capacitor 18 remains charged due to the fact that the current limiting resistor 14 is of such a value that the current it permits to pass therethrough is insufficient to maintain conduction of the silicon controlled rectifier 16. Under these conditions silicon controlled rectifier 16 returns to the nonconductive state and capacitor 18 recharges to the potential of the power supply 6, thus resetting this trigger for activation by a succeeding pulse of the proper polarity and magnitude appearing at input terminals 8.

The pulse generated by the triggering circuit in response to an input pulse on terminals 8 is transferred by the capacitors 22 and 23 co-acting with bias resistors 24 and 26 to initiate the simultaneous conduction of silicon controlled rectifiers 9 and 11. With silicon controlled rectifier 9 in the conductive state the load 7 is thereby energized. The load being such that the current transmitted therethrough is sufficient to keep the silicon controlled rectifier in the conductive state so that the anode of silicon controlled rectifier 9 is slightly above ground potential due to the almost negligible voltage drop across the silicon controlled rectifier 9. The current limiting resistor 12, connected between the power supply 6 and the anode of the silicon controlled rectifier 11, as well as resistor 14 are of the starvation or current limiting type in that they are unable to maintain the conduction of silicon controlled rectifiers by the current passing therethrough. The capacitor 13 having both of its terminals connected to the anodes of silicon controlled rectifiers 9 and 11 will be at an initially positive potential, the same as power supply 6. Upon the occurrence of the first initiating pulse silicon controlled rectifier 9 will become conductive while silicon controlled rectifier 11 will remain in the nonconductive state due to the current limiting resistor 12. Capacitor 13 in this state begins to become charged to the power supply voltage 6 due to the state of conduction of silicon controlled rectifiers 9 and 11. The load 7 is thus energized and silicon controlled rectifier 9 is in the conductive state at the same time silicon controlled rectifiers 11 and 16 are in the nonconductive state. Upon receipt of the next proper pulse by input terminals 8 silicon controlled rectifier 16 is triggered on and generates a second triggering pulse which is transferred through the transfer circuit to both silicon controlled rectifiers 9 and 11 in the same manner as has been stated hereinbefore. Silicon controlled rectifier 9 being in the conductive state is unaltered by the receipt of the additional triggering pulse. However, silicon controlled rectifier 11 is switched from the nonconductive state to the conductive state and capacitor 13, with its one terminal connected to the anode of silicon controlled rectifier 11 charged to a positive potential and the other terminal connected to the anode of silicon controlled rectifier 9 being almost at ground potential, the capacitor 13 discharges through the silicon controlled rectifier 11. Due to the commutation action of capacitor 13 the anode of silicon controlled rectifier 9 goes slightly negative, thereby turning off the silicon controlled rectifier 9. Silicon controlled rectifier 11, due to the current limiting or starvation resistor 12, will turn off when the positive voltage from capacitor 13 is discharged through silicon controlled rectifier 11. The second pulse thereby has caused both silicon controlled rectifiers 9 and 11 to turn off thereby switching the load from the conductive state to the nonconductive sttae. Upon arrival of the next pulse at the input terminals 8 the sequence is repeated so that successively arriving pulses at input terminal 8 will alternately turn the load from the conductive state to the nonconductive state.

Although silicon control rectifiers have been disclosed in the circuitry of this invention it is possible to utilize a gas tube having a control grid and commonly known as the thyratron.

Various modifications are contemplated and may obviously be resorted to by those skilled in the art without departing from the spirit and scope of the invention, as hereinafter defined by the appended claim, as the only illustrative embodiment thereof has been disclosed.

What is claimed is:

A switching circuit for alternately switching a load from a conductive to a nonconductive state comprising:

a power source, a first silicon controlled rectifier having its cathode connected to ground, a load having one terminal connected to said power source and the other terminal connected to the anode of said first silicon controlled rectifier.

a second silicon controlled rectifier having its cathode connected to ground, a current limiting resistor connected between said power source and the anode of said second silicon controlled rectifier and being incapable of maintaining conduction of said silicon controlled rectifier, a capacitor connected between the anodes of said first and said second silicon controlled rectifier respectively, a third silicon controlled rectifier having an input gate terminal for receiving pulses from an external source, another current limiting resistor connected between said power source and the anode of said third silicon controlled rectifier, a bias resistor connected between ground and the cathode of said third silicon controlled rectifier, and another capacitor connected between ground and the anode of said third silicon controlled rectifier, whereby an input pulse of the proper polarity and magnitude at the input gate terminal initiates conduction of said third silicon controlled rectifier and the charge on said other capacitor maintains conduction of said third silicon controlled rectifier for a predetermined time producing an output pulse across said bias resistor and initiates conduction of said first and said second silicon controlled rectifiers and said current limiting resistor subsequently terminates said second silicon controlled rectifier, and a second output pulse generated by said third silicon controlled rectifier initiates conduction of said second silicon control rectifier and the commutation action of said capacitor terminates the conduction of said first silicon controlled rectifier and said current limiting resistor terminates conduction of said second silicon controlled rectifier.

References Cited by the Examiner

UNITED STATES PATENTS

| | | | |
|---|---|---|---|
| 3,040,270 | 6/62 | Gutzwiller | 307—88.5 |
| 3,113,293 | 12/63 | Breese et al. | 307—88.5 |

ARTHUR GAUSS, *Primary Examiner*.